a2 United States Patent
Hara et al.

(10) Patent No.: US 11,120,478 B2
(45) Date of Patent: Sep. 14, 2021

(54) JOINT-BASED ITEM RECOGNITION

(71) Applicant: eBay Inc., San Jose, CA (US)

(72) Inventors: Kota Hara, College Park, MD (US); Vignesh Jagadeesh, Santa Clara, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 395 days.

(21) Appl. No.: 14/963,026

(22) Filed: Dec. 8, 2015

(65) Prior Publication Data

US 2016/0203525 A1 Jul. 14, 2016

Related U.S. Application Data

(60) Provisional application No. 62/102,486, filed on Jan. 12, 2015.

(51) Int. Cl.
G06Q 30/02 (2012.01)
G06K 9/62 (2006.01)
(Continued)

(52) U.S. Cl.
CPC ..... *G06Q 30/0271* (2013.01); *G06K 9/00369* (2013.01); *G06K 9/6269* (2013.01);
(Continued)

(58) Field of Classification Search
None
See application file for complete search history.

(56) References Cited

U.S. PATENT DOCUMENTS 5,404,507 A 4/1995 Bohm et al.
7,873,189 B2 * 1/2011 Jee .................. G06K 9/00221
382/118
(Continued)

FOREIGN PATENT DOCUMENTS

CN 1834992 A 9/2006
CN 101359373 A 2/2009
(Continued)

OTHER PUBLICATIONS

Yannis Kalantidis; Lyndon Kennedy, Li-Jia Li, Getting the Look: Clothing Recognition and Segmentation for Automatic Product Suggestions in Everyday Photos—ICMR '13 Proceedings of the 3rd ACM conference on International conference on multimedia retrieval pp. 105-112, Dallas, Texas 2013 (Year: 2013).*
(Continued)

*Primary Examiner* — Michael J Sittner
(74) *Attorney, Agent, or Firm* — Faegre Drinker Biddle & Reath LLP

(57) ABSTRACT

For an input image of a person, a set of object proposals are generated in the form of bounding boxes. A pose detector identifies coordinates in the image corresponding to locations on the person's body, such as the waist, head, hands, and feet of the person. A convolutional neural network receives the portions of the input image defined by the bounding boxes and generates a feature vector for each image portion. The feature vectors are input to one or more support vector machine classifiers, which generate an output representing a probability of a match with an item. The distance between the bounding box and a joint associated with the item is used to modify the probability. The modified probabilities for the support vector machine are then compared with a threshold and each other to identify the item.

20 Claims, 10 Drawing Sheets

(51) Int. Cl.

| | |
|---|---|
| *G06T 11/60* | (2006.01) |
| *G06K 9/00* | (2006.01) |
| *G06K 9/72* | (2006.01) |
| *G06N 20/00* | (2019.01) |
| *G06N 20/10* | (2019.01) |
| *G06N 3/04* | (2006.01) |

(52) U.S. Cl.
CPC ............ *G06K 9/6277* (2013.01); *G06K 9/72* (2013.01); *G06N 20/00* (2019.01); *G06N 20/10* (2019.01); *G06Q 30/0258* (2013.01); *G06T 11/60* (2013.01); *G06N 3/0454* (2013.01)

(56) References Cited

U.S. PATENT DOCUMENTS

| | | | |
|---|---|---|---|
| 7,949,191 | B1 | 5/2011 | Ramkumar et al. |
| 8,478,052 | B1 | 7/2013 | Yee et al. |
| 8,635,124 | B1 | 1/2014 | Hamilton et al. |
| 8,655,053 | B1* | 2/2014 | Hansen .................... G06K 9/00 382/154 |
| 8,761,512 | B1 | 6/2014 | Buddemeier et al. |
| 8,775,436 | B1 | 7/2014 | Zhou et al. |
| 2006/0147127 | A1 | 7/2006 | Slavin |
| 2006/0210195 | A1 | 9/2006 | Ohguro |
| 2006/0251292 | A1 | 11/2006 | Burak et al. |
| 2008/0025568 | A1 | 1/2008 | Han et al. |
| 2008/0267504 | A1 | 10/2008 | Schloter |
| 2009/0304267 | A1 | 12/2009 | Tapley et al. |
| 2011/0033119 | A1* | 2/2011 | Rezazadeh ........... G06K 9/4604 382/199 |
| 2011/0153653 | A1 | 6/2011 | King et al. |
| 2011/0182482 | A1 | 7/2011 | Winters |
| 2011/0238659 | A1 | 9/2011 | Chittar et al. |
| 2011/0264549 | A1 | 10/2011 | Lewis et al. |
| 2011/0274314 | A1 | 11/2011 | Yang |
| 2013/0121571 | A1 | 5/2013 | Gokturk et al. |
| 2013/0159920 | A1 | 6/2013 | Scott et al. |
| 2013/0204707 | A1 | 8/2013 | Ptucha et al. |
| 2013/0265450 | A1* | 10/2013 | Barnes, Jr. ............. G06Q 30/02 348/207.1 |
| 2013/0279816 | A1* | 10/2013 | Zhang ................ G06K 9/00362 382/225 |
| 2014/0046935 | A1 | 2/2014 | Bengio et al. |
| 2014/0100955 | A1* | 4/2014 | Osotio ............... G06Q 30/0261 705/14.55 |
| 2014/0100991 | A1 | 4/2014 | Lenahan et al. |
| 2014/0164406 | A1 | 6/2014 | Petrou |
| 2014/0249961 | A1* | 9/2014 | Zagel ................ G06K 9/00369 705/26.61 |
| 2014/0310304 | A1 | 10/2014 | Bhardwaj et al. |
| 2015/0009035 | A1* | 1/2015 | Rasband ................ G07G 3/003 340/572.3 |
| 2015/0046935 | A1 | 2/2015 | Wei et al. |
| 2015/0243031 | A1* | 8/2015 | Narasimha ........... G06K 9/6256 382/103 |
| 2015/0379003 | A1* | 12/2015 | Dorner .............. G06F 17/30265 707/772 |
| 2016/0217157 | A1 | 7/2016 | Shih et al. |

FOREIGN PATENT DOCUMENTS

| | | |
|---|---|---|
| CN | 101408933 A | 4/2009 |
| CN | 100576233 C | 12/2009 |
| CN | 101743541 A | 6/2010 |
| CN | 102339289 A | 2/2012 |
| CN | 104112216 A | 10/2014 |
| EP | 1703444 A2 | 9/2006 |
| EP | 1710717 A1 | 10/2006 |
| JP | 2006-260274 A | 9/2006 |
| JP | 4607633 B2 | 1/2011 |
| WO | WO-2016114960 A1 | 7/2016 |
| WO | WO-2016118339 A1 | 7/2016 |

OTHER PUBLICATIONS

Liu et al. (S. Liu, J. Feng, Z. Song, T. Zhang, H. Lu, C. Xu, and S. Yan. Hi, magic closet, tell me what to wear! In ACM Multimedia, 2012 (Year: 2012).*
Non-Final Office Action received for U.S. Appl. No. 14/973,582, dated Dec. 15, 2017, 25 pages.
U.S. Appl. No. 14/973,582, Response filed Mar. 15, 2018 to Non Final Office Action dated Dec. 15, 2017, 13 pgs.
Final Office Action received for Korean Patent Application No. 10-2017-7023364, dated Apr. 25, 2019, 9 Pages (4 pages of Official Copies and 5 pages of English Translation).
Notice of Allowance received for Korean Patent Application No. 10-2017-7023364, dated Jul. 25, 2019, 3 pages (2 Pages of official copy and 1 page of English translation).
Office Action received for Korean Patent Application No. 10-2017-7023364, dated Oct. 15, 2018, 12 pages (7 pages of official copy and 5 pages of English translation).
Communication Pursuant to Article 94(3) EPC received for European Patent Application No. 16740502.6, dated Nov. 6, 2018, 9 pages.
Extended European Search Report received for European Patent Application No. 16740502.6, dated Nov. 14, 2017, 12 pages.
Office Action Received for Chinese Patent Application No. 201680014377.X, dated Feb. 3, 2020, 10 pages (Official Copy only).
Office Action Received for Chinese Patent Application No. 201680014377.X, dated Jul. 9, 2020, 7 pages(Official copy Only).
Jonathan et al., "Language Identification in Complex, Unoriented, and Degraded Document Images", In: "Progress in Computer Vision and Image Analysis", Apr. 1, 1998 (Apr. 1, 1998), World Scientific, Apr. 1, 1998, 24 pages.
Endres, Ian, et al., "Category-Independent Object Proposals with Diverse Ranking", IEEE Transactions on Pattern Analysis and Machine Intelligence, vol. 36, No. 2, (Feb. 2014), 222-234.
Fukushima, Kunihiko, "Neocognitron: A Self-organizing Neural Network Model for a Mechanism of Pattern Recognition Unanffected by Shift in Positoin", Biol. Cybernetics 36, (1980), 193-202.
Hernandez, Antonio, et al., "Spatio-Temporal GrabCut Human Segmentation for Face and Pose Recovery", (CVPRW) IEEE, (2010), 8 pgs.
Merck, Derek, et al., "A Methodology for Constructing Geometric Priors and Likelihoods for Deformable Shape Models", UNC Chapel Hill Technical Report, (2006), 9 pgs.
Navarro, Gonzalo, et al., "Indexing Methods for Approximate String Matching", IEEE (Bulletin of the IEEE Computer Society Technical Committee on Date Engineering), (2001), 1-9.
Rother, Carsten, et al., "GrabCut—Interactive Foreground Extraction using Iterated Graph Cuts", ACM Transactions on Graphics, 23(3), (2004), 309-314.
Singh, Saurabh, et al., "Unsupervised Discovery of Mid-Level Discriminative Patches", 12th European ECCV Proceedings, Part II, [Online]. Retrieved from the Internet: <URL: http://graphics.cs.cmu.edu/projects/discriminativePatches/>, (2012), 73-86.
Tsai, Sam S, et al., "Combining Image and Text Features: A Hybrid Approach to Mobile Book Spine Recognition", MM'11, Nov. 28-Dec. 1, 2011, 4 pgs.
Uijlings, J R, et al., "Selective Search for Object Recognition (Technical Report, submitted to IJCV)", International Journal of Computer Vision, (2012), 1-14.
Yamaguchi, Kota, et al., "Parsing Clothing in Fashion Photographs", IEEE Conference on Computer Vision and Pattern Recognition, (2012), 3570-3577.
"International Application Serial No. PCT/US2016/012371, International Preliminary Report on Patentability dated Jul. 27, 2017", 8 pgs.
"International Application Serial No. PCT/US2016/012691, International Preliminary Report on Patentability dated Aug. 3, 2017", 3 pgs.
"International Application Serial No. PCT/US2016/012371, International Search Report dated Mar. 28, 2016", 2 pgs.

(56) References Cited

OTHER PUBLICATIONS

"International Application Serial No. PCT/US2016/012371, Written Opinion dated Mar. 28, 2016", 6 pgs.
"International Application Serial No. PCT/US2016/012691, International Search Report dated Mar. 17, 2016", 2 pgs.
"International Application Serial No. PCT/US2016/012691, Written Opinion dated Mar. 17, 2016", 5 pgs.
"U.S. Appl. No. 14/973,582, Final Office Action dated Jul. 12, 2018", 25 pgs.
Hara, "Fashion Apparel Detection: the Role of Deep Convolutional Neural Network and Pose-dependent Priors", (Nov. 2014), 9 pages.

* cited by examiner

JOINT-BASED ITEM RECOGNITION

PRIORITY CLAIM

The application claims priority to U.S. Provisional Patent Application No. 62/102,486, filed Jan. 12, 2015, entitled "Fashion Apparel Detection," which is incorporated herein by reference in its entirety.

TECHNICAL FIELD

The subject matter disclosed herein generally relates to the use of deep convolutional neural networks for classifying data in conjunction with pose detectors. Specifically, the present disclosure addresses systems and methods related to the identification of items of based on joints using deep convolutional neural networks in conjunction with pose detectors.

BACKGROUND

A deep convolutional neural network (CNN) can be used to classify images based on items shown in the images. CNNs are usually effective only when the detected items occupy more than about 35% of each image. In photographs of people that capture all or most of the person, fashion apparel items may take up a small portion of each image. Accordingly, CNNs have difficulty in classifying items based on fashion apparel.

BRIEF DESCRIPTION OF THE DRAWINGS

Some embodiments are illustrated, by way of example and not limitation, in the figures of the accompanying drawings.

DETAILED DESCRIPTION

Example methods and systems are directed to joint-based item recognition using CNNs in conjunction with pose detectors. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To identify fashion apparel in images, a detection based approach using object proposals is used. The detection results are given in the form of bounding boxes. Detected fashion apparel may be used to drive a visual search algorithm with the detected portion of the image used as a query. For example, a bag held by Paris Hilton can be detected and used as a query to search an e-commerce inventory, select advertisements for similar bags or complementary items, or any suitable combination thereof.

Detection of items using bounding boxes may provide better results than methods using pixels or super-pixels (small groups of pixels) by having lower memory and processing requirements and having greater access to training data. Challenges in identifying fashion items include a large deformation of clothing, a similarity in appearance of some fashion classes (e.g., a skirt and a bottom of a dress), ambiguity in definitions, and a small size of some fashion items.

A pose detector identifies a set of important coordinates in an image, termed "joints." For example, in an image of a person, the pose detector can identify the waist, head, hands, and feet of the person. Associations between joints and particular types of items can be created. For example, the waist can be associated with belts, the head can be associated with hats and headphones, the hands can be associated with gloves and bags, the feet can be associated with shoes and boots, or any suitable combination thereof.

The portions of the image defined by the bounding boxes are extracted and resized to a standard size. One or more CNNs are used to classify the image portion to determine if an object is present and to classify the object, if present. The probability of a match can be modified by a factor proportional to the distance between the center of the bounding box and the closest joint associated with the possibly-matched object. For example, if a patch of the image has a 60% probability of containing a hat based on image analysis alone, but is far from the head, the probability can be reduced. Similarly, if the patch is very close to the head, the probability can be increased. This combination of object proposals with one or more CNNs is termed an R-CNN. This analysis may be performed as described in more detail with respect to FIGS. 2-7 below.

Figure 1:
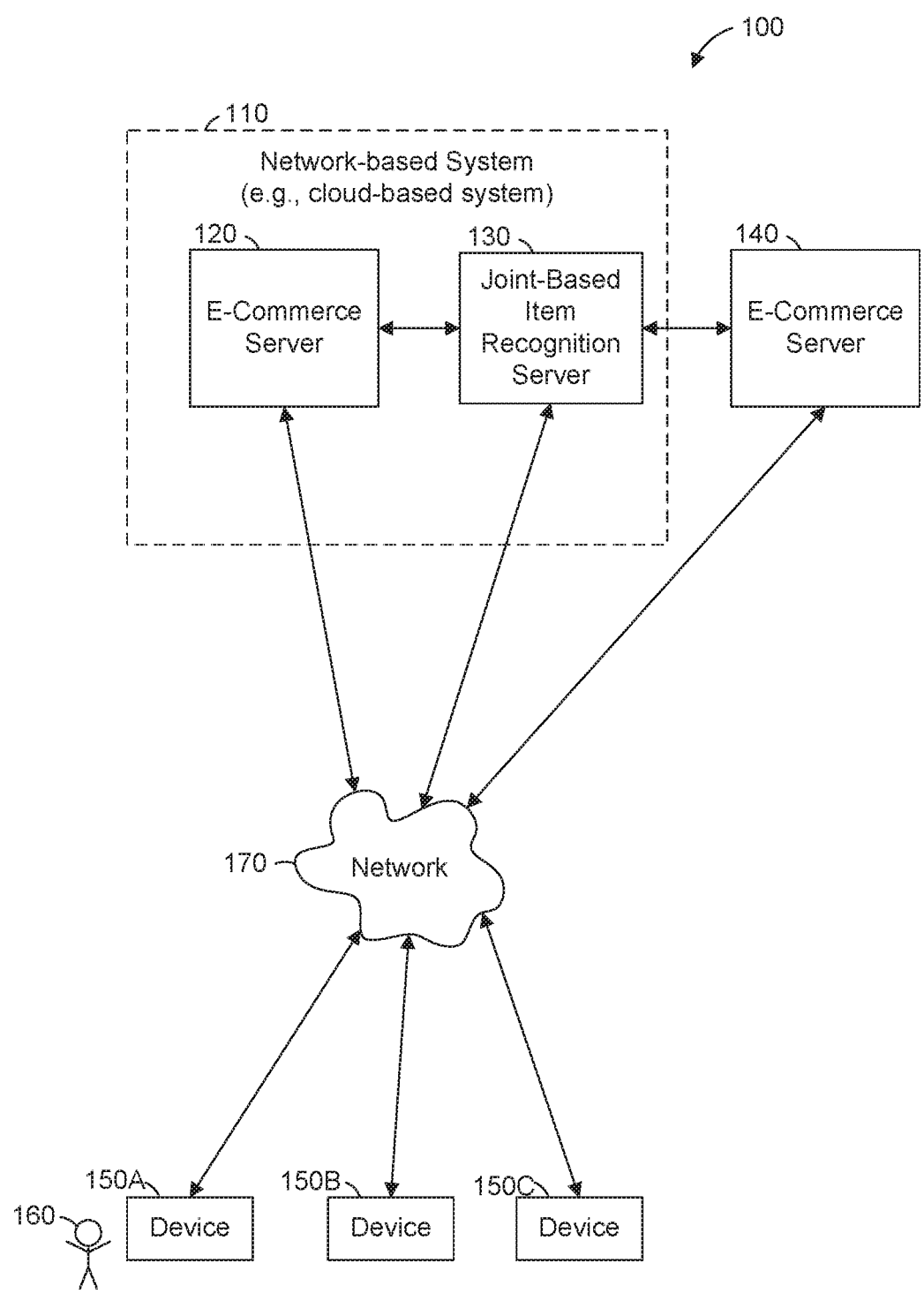
FIG. 1 is a network diagram illustrating a network environment suitable for joint-based item recognition using CNNs in conjunction with pose detectors, according to some example embodiments.

FIG. 1 is a network diagram illustrating a network environment 100 suitable for identification of items of fashion apparel using CNNs in conjunction with pose detectors, according to some example embodiments. The network environment 100 includes e-commerce servers 120 and 140, a joint-based item recognition server 130, and devices 150A, 150B, and 150C, all communicatively coupled to each other via a network 170. The devices 150A, 150B, and 150C may be collectively referred to as "devices 150," or generically referred to as a "device 150." The e-commerce servers 120 and 140 and the joint-based item recognition server 130 may be part of a network-based system 110. Alternatively, the devices 150 may connect to the joint-based item recognition server 130 directly or over a local network distinct from the network 170 used to connect to the e-commerce server 120 or 140. The e-commerce servers 120 and 140, the joint-based item recognition server 130, and the devices 150 may each be implemented in a computer system, in whole or in part, as described below with respect to FIGS. 9-10.

The e-commerce servers 120 and 140 provide an electronic commerce application to other machines (e.g., the devices 150) via the network 170. The e-commerce servers 120 and 140 may also be connected directly to, or integrated with, the joint-based item recognition server 130. In some example embodiments, one e-commerce server 120 and the joint-based item recognition server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

The joint-based item recognition server 130 creates an R-CNN for classifying images, uses an R-CNN to classify images, or both. For example, the joint-based item recognition server 130 can create an R-CNN for classifying images based on a training set or a preexisting R-CNN can be loaded onto the joint-based item recognition server 130. The joint-based item recognition server 130 can also respond to requests for identification of fashion items in images by providing a set of fashion items for the image. The joint-based item recognition server 130 may provide data to other machines (e.g., the e-commerce servers 120 and 140 or the devices 150) via the network 170 or another network. The joint-based item recognition server 130 may receive data from other machines (e.g., the e-commerce servers 120 and 140 or the devices 150) via the network 170 or another network. In some example embodiments, the functions of the joint-based item recognition server 130 described herein are performed on a user device, such as a personal computer, tablet computer, or smart phone.

Also shown in FIG. 1 is a user 160. The user 160 may be a human user (e.g., a human being), a machine user (e.g., a computer configured by a software program to interact with the devices 150 and the joint-based item recognition server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the joint-based item recognition server 130 receives data regarding an item of interest to a user. For example, a camera attached to the device 150A can take an image of a person wearing an item the user 160 wishes to sell and transmit the image over the network 170 to the joint-based item recognition server 130. The joint-based item recognition server 130 identifies one or more items (e.g., fashion items) in the image. Data for the fashion items (e.g., name, type, price, designer, or any suitable combination thereof) can be sent to e-commerce server 120 or 140, to the device 150A, or any combination thereof. The data can be used by the e-commerce server 120 or 140 to aid in generating a listing of one or more of the items for sale. Similarly, the image may be of a person wearing an item of interest to the user 160, and the data regarding the fashion item or items can be used by the e-commerce server 120 or 140 to aid in selecting listings of items to show to the user 160.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 9-10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 170 may be any network that enables communication between or among machines, databases, and devices (e.g., the joint-based item recognition server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
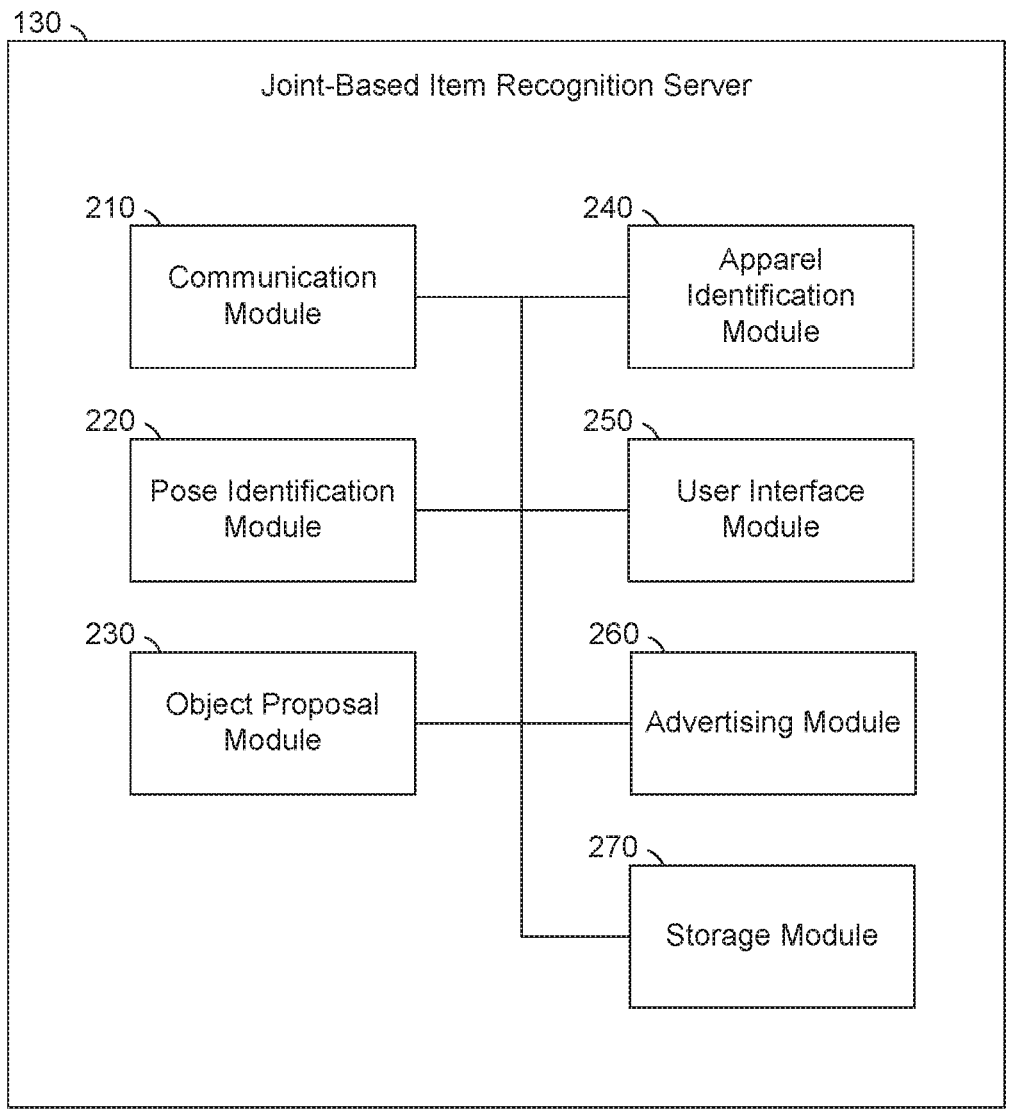
FIG. 2 is a block diagram illustrating components of a fashion detection server suitable for joint-based item recognition, according to some example embodiments.

FIG. 2 is a block diagram illustrating components of the joint-based item recognition server 130, according to some example embodiments. The joint-based item recognition server 130 is shown as including a communication module 210, a pose identification module 220, an object proposal module 230, an apparel identification module 240, a user interface module 250, an advertising module 260, and a storage module 270 all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the pose identification module 220. As another example, the apparel identification module 240 may identify a fashion item, and data regarding the identified item may be transmitted by the communication module 210 over the network 170 to the e-commerce server 120.

The pose identification module 220 is configured to identify a pose of a person depicted in an image. The pose identification module 220 may be implemented using an off-the-shelf pose estimator. The pose estimator takes an image that includes a person as input and provides a set of two-dimensional (2D) joint locations on the image. Each joint is a point of interest on the body and does not necessarily correspond to points physiologically considered to be joints. Example joints include right hip, left hip, head, neck, right shoulder, left shoulder, right ankle, left ankle, right knee, and left knee.

The object proposal module 230 is configured to identify likely discrete objects depicted in an image. In some example embodiments, the object proposal module 230 performs hierarchical segmentation, generates proposed regions, and then ranks the proposed regions. The proposed regions may be selected for output by the object proposal module 230 based on a score or a rank among proposed regions. The proposed regions are identified in the form of proposed bounding boxes within the image.

The apparel identification module 240 is configured to identify one or more fashion apparel items depicted in the input image. The proposed bounding boxes from the object proposal module 230 are used as inputs to one or more support vector machine (SVM) classifiers. The results from the SVMs are correlated with the likely classification for each bounding box determined based on the results from the pose identification module 220. For example, if a particular bounding box has a high probability of matching both a headband and a belt, but the pose detection module shows that the bounding box is in the vicinity of a person's head, the likelihood of the depicted item being a headband can be increased and the likelihood of the depicted item being a belt can be decreased. The adjusted results may further be passed through a non-maximum suppression (NMS) algorithm, which suppresses image information that is not part of local maxima. This use of the NMS prevents multiple bounding boxes from being matches for a single fashion apparel item. The results, as adjusted, of the SVMs are used (e.g., ranked) by the apparel identification module 240 to determine the most likely fashion apparel item for the input bounding box. By processing each bounding box and removing duplicates, a set of unique fashion apparel items is generated for the input image.

The user interface module 250 is configured to cause a user interface to be presented on one or more of the user devices 150A-150C. For example, the user interface module 250 may be implemented by a web server providing HTML files to a user device 150 via the network 170. The user interface may present the image received by the communication module 210, the joints generated by the pose identification module 220, the bounding boxes generated by the object proposal module 230, data regarding items identified by the apparel identification module 240, advertising selected by the advertising module 260, or any suitable combination thereof. The user interface may also present listings of items for sale (e.g., listings retrieved from the e-commerce server 120 or 140).

The advertising module 260 is configured to retrieve advertisements relevant to apparel identified by the apparel identification module 240. For example, if the image includes an Armani suit, an advertisement for the Armani suit itself may be retrieved, advertisements for substitute items such as other suits may be retrieved, advertisements for complementary items such as cuff links may be retrieved, or any suitable combination thereof.

The storage module 270 is configured to store and retrieve data generated and used by the pose identification module 220, the object proposal module 230, the apparel identification module 240, the user interface module 250, and the advertising module 260. For example, the joint vertices generated by the pose identification module 220 can be stored by the storage module 270 for retrieval by the apparel identification module 240. Information regarding fashion apparel items depicted in an image, generated by the apparel identification module 240, can also be stored by the storage module 270. The e-commerce server 120 or 140 can request the fashion items for an image (e.g., by providing an image identifier) which can be retrieved from storage by the storage module 270 and sent over the network 170 using the communication module 210.

Figure 3:
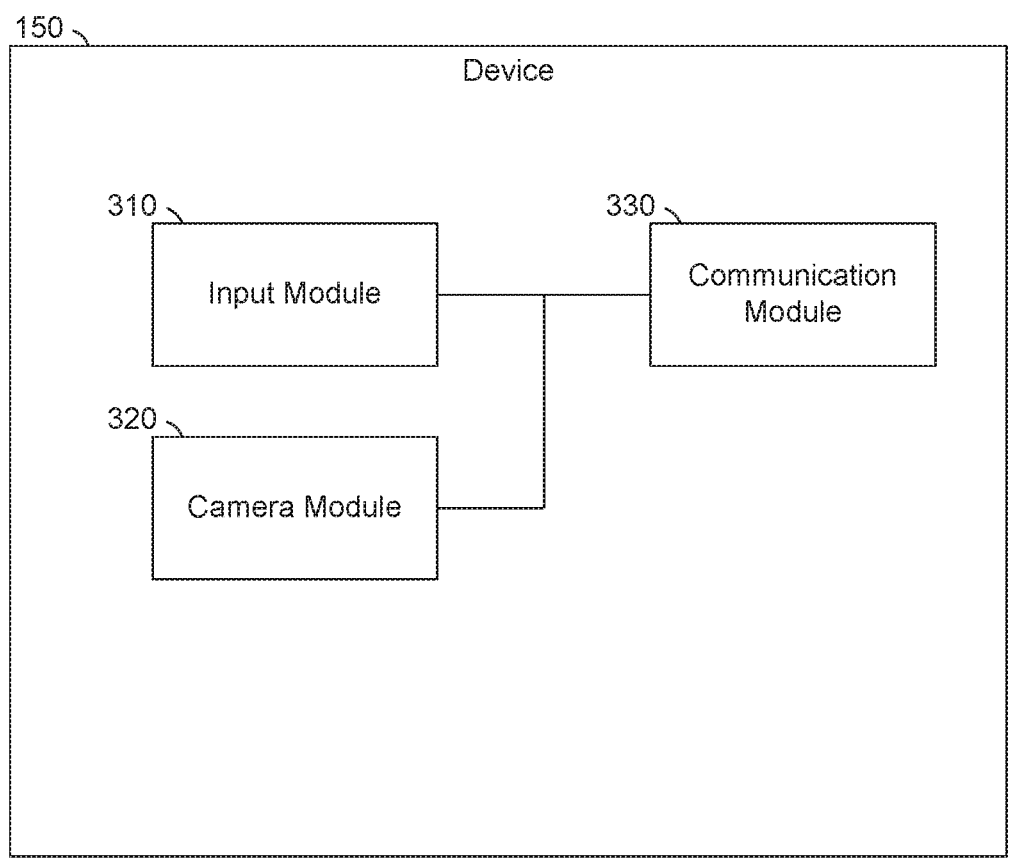
FIG. 3 is a block diagram illustrating components of a device suitable for joint-based item recognition, according to some example embodiments.

FIG. 3 is a block diagram illustrating components of the device 150, according to some example embodiments. The device 150 is shown as including an input module 310, a camera module 320, and a communication module 330, all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter their username and password into the input module, configure a camera, select an image to use as a basis for a listing or an item search, access a social network, or any suitable combination thereof.

The camera module 320 is configured to capture image data. For example, an image may be received from a camera, a depth image may be received from an infrared camera, a pair of images may be received from a binocular camera, and so on.

The communication module 330 is configured to communicate data received b the input module 310 or the camera module 320 to the joint-based item recognition server 130, the e-commerce server 120, or the e-commerce server 140. For example, the input module 310 may receive a selection of an image taken with the camera module 320 and an indication that the image depicts an item the user (e.g., user 160) wishes to sell. The communication module 330 may transmit the image and the indication to the e-commerce server 120. The e-commerce server 120 may send the image to the joint-based item recognition server 130 to identify one or more fashion items in the image, generate a listing template based on the identified item or items, and cause the listing template to be presented to the user via the communication module 330 and the input module 310. As another example, the input module 310 may receive a selection of an image stored on the device 150 or on network storage accessed via the network 170 and an indication that the image depicts an item the user desires more information about. The communication module 330 may transmit the image and the indication to the joint-based item recognition server 130. The joint-based item recognition server 130 may identify one or more fashion items in the image and access information regarding those items in an item database. The communication module 330 may receive the accessed information and cause the information to be displayed to the user.

Figure 4:
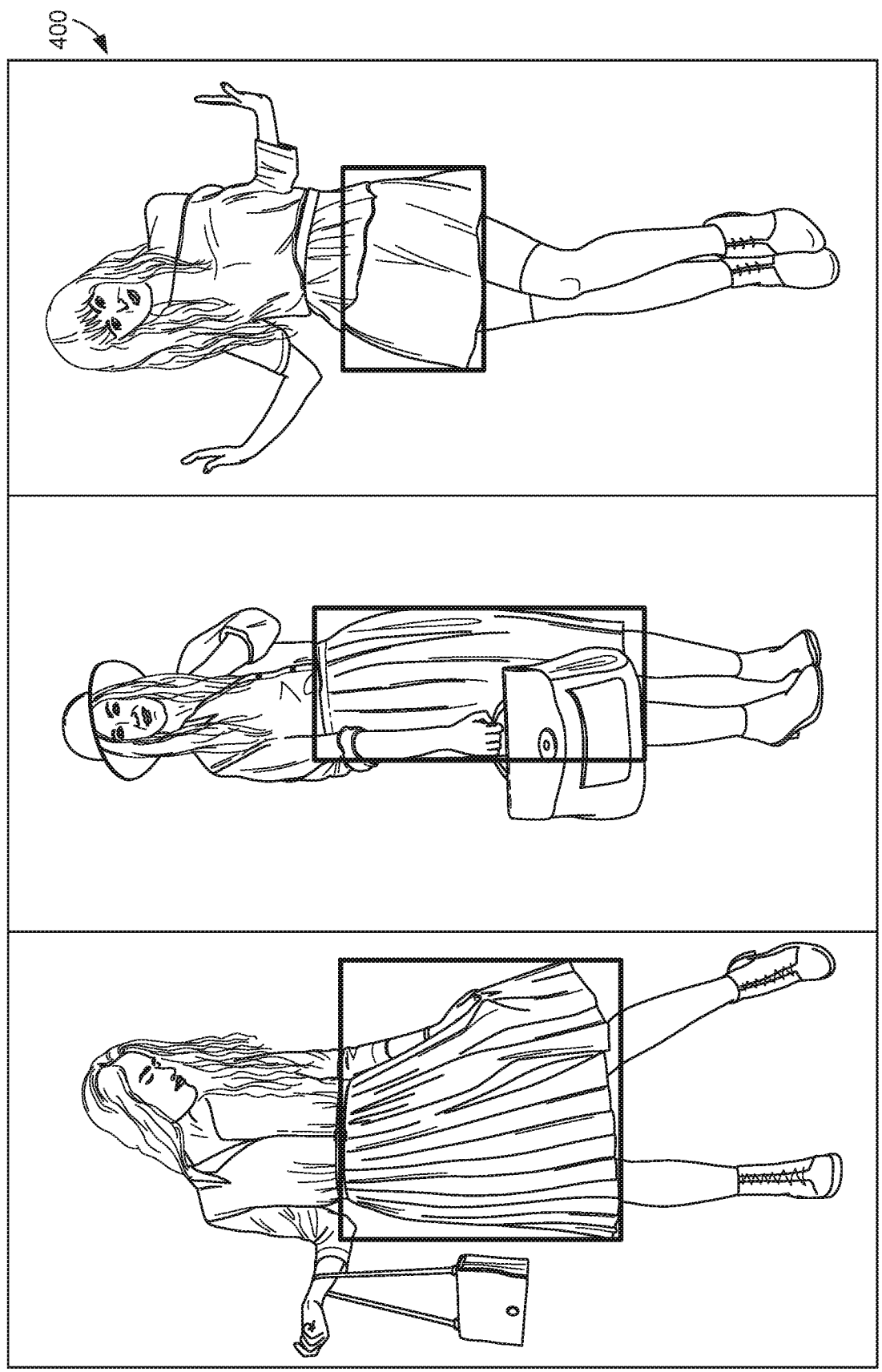
FIG. 4 is a set of images showing bounding boxes for fashion apparel, according to some example embodiments.

FIG. 4 is a set of images showing bounding boxes for fashion apparel, according to some example embodiments. In FIG. 4, three separate images of people wearing skirts are shown. In each image, the skirt is surrounded by a bounding box. As can be seen in FIG. 4, the size and shape of the bounding boxes of the skirts varies widely. Accordingly, use of the object proposal module 230 to propose bounding boxes may provide better results than the use of a standard bounding box size and shape, even if the standard bounding box is allowed to vary based on the type of fashion item being detected.

Figure 5:
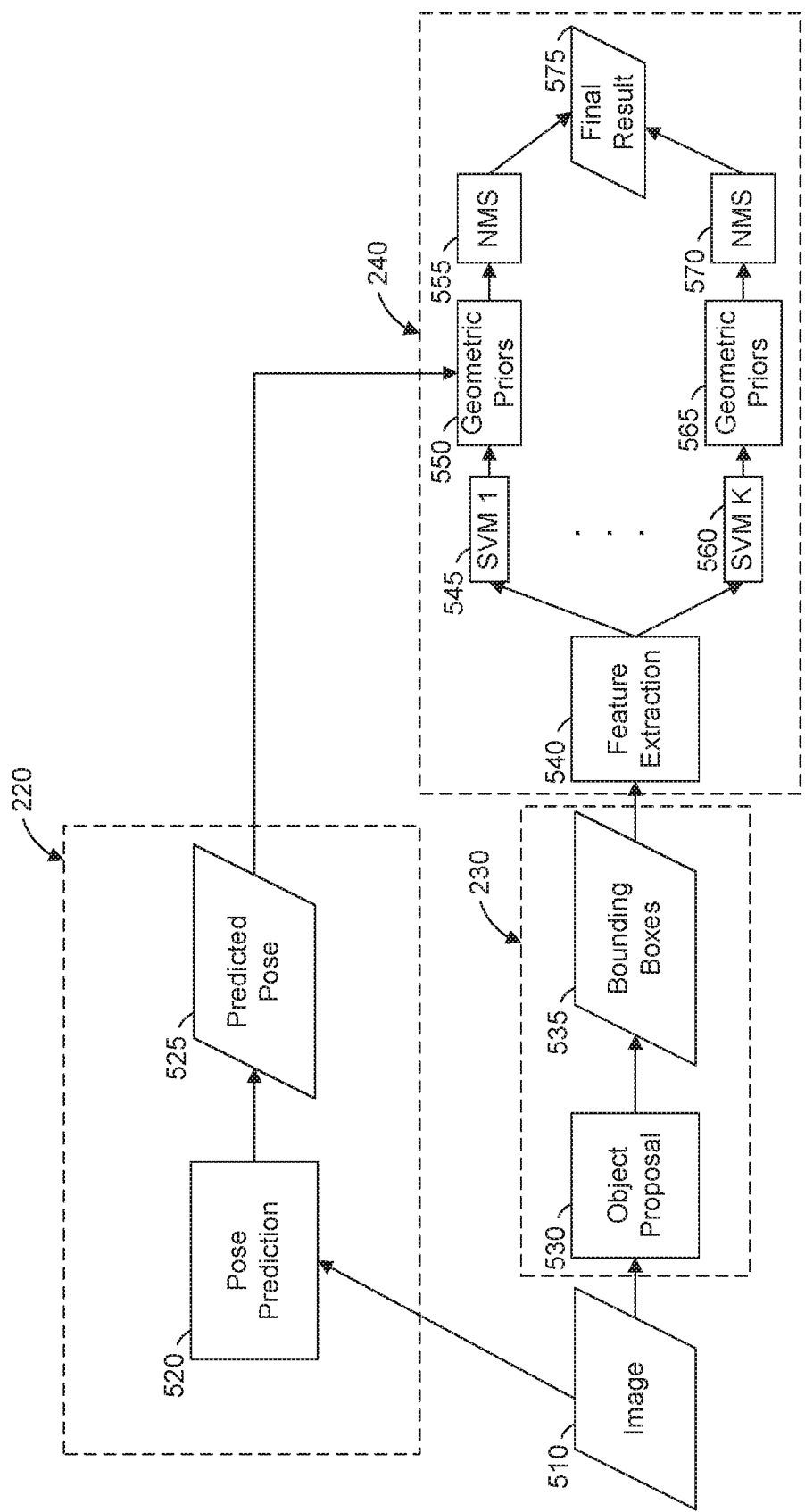
FIG. 5 is a block diagram illustrating relationships between components of a server configured to perform joint-based item recognition using CNNs in conjunction with pose detectors, according to some example embodiments.

FIG. 5 is a block diagram illustrating relationships between components of a server configured to identify items of fashion apparel using CNNs in conjunction with pose detectors (e.g., the joint-based item recognition server 130). An image 510 is received as input by the joint-based item recognition server 130 and processed by the pose identification module 220, the object proposal module 230, and the apparel identification module 240 to generate a final result 575.

The pose identification module 220 performs pose prediction on the image 510 in a pose prediction operation 520 to generate predicted pose data 525. The object proposal module 230 generates a set of bounding boxes 535 in an object proposal operation 530. The bounding boxes are fed to a feature extraction operation 540 of the apparel identification module 240. In the feature extraction operation 540, the portion of the image identified by each bounding box is resized to a standard image size, and then fed into a CNN to extract features for the portion of the image within the bounding box. For example, the CNN may generate a vector with binary values indicating whether each feature is present or absent within the image portion. The vector is then used as an input to the K trained SVMs (elements 545 and 560 of FIG. 5). Each SVM classifies the image portion as either containing or not containing a particular item. The detection results of the SVMs are combined with geometric priors generated from the predicted pose data 525 in operation 550 (and 565). The results are further modified in operations 555 and 570 by use of an NMS algorithm, and combined to generate the final result 575. The individual final result 575 indicates whether the extracted feature represents a fashion item, and if it does, which fashion item it represents.

The set of final results 575 for all extracted features can be considered as a list of bounding boxes and associated fashion items. The list can be culled to remove duplicates. For example, several candidate bounding boxes of different sizes that each encompass a particular fashion item may have been generated by the object proposal module 230. Each of those candidate bounding boxes may have been resolved by the apparel identification module 240 as containing the particular fashion item. Accordingly, the set of final results 575 will contain multiple bounding boxes associated with the particular fashion item, which may be undesirable. The set of final results 575 can be culled to contain only one bounding box for each identified particular fashion item. For example, the first identified bounding box for the item can be kept and duplicates discarded. As another example, the smallest bounding box containing the item can be kept and all others discarded.

Object detection based on a sliding window strategy has been a standard approach where object detectors are exhaustively run on all possible locations and scales of the image. To accommodate the deformation of the objects, most recent works detect a single object by a set of part-specific detectors and allow the configurations of the parts to vary. Although a certain amount of deformation is accommodated, possible aspect ratios considered are still limited and the computation time increases linearly as the number of part detectors increases. In the task of fashion apparel identification, the intra-class shape variation is large. For instance, as shown in FIG. 4 and discussed above, bounding boxes of three instances from the same "skirt" class have very different aspect ratios. Thus, for practical use, detection methods which can accommodate various deformations without significant increase in computation time represent an improvement over the state of the art.

The object proposal module 230 generates a set of candidate bounding boxes with various aspect ratios and scales. Each bounding box is expected to contain a single object. An image patch within a bounding box is resized to a predefined size and image features are extracted. Since the feature computation is done only at the generated bounding boxes, the computation time is significantly reduced while allowing various aspect ratios and scales, when compared to methods that exhaustively consider each possible bounding box. When compared to methods that operate on small superpixels, object proposals are more robust. Selective Search (SS), as described in Selective Search for Object Recognition, INTERNATIONAL JOURNAL OF COMPUTER VISION, Uijlings et al. (2013), is an example object proposal method that may be used by the object proposal module 230.

For each object class, a linear SVM is trained to classify an image patch as positive or negative. The training patches are extracted from the training data with ground-truth bounding boxes.

A probabilistic model is used to combine outputs from the SVM and the priors on the object location, size and aspect ratio (geometric priors) into a final posterior for each object proposal. The computed posterior is used as a score for each detection. An example implementation follows. The slash character, "/", may be used herein to indicate division.

Let $B=(x_1, y_1, x_2, y_2)$ denote bounding box coordinates of an object proposal. Let $f$ denote image features extracted from B. Denote by $c=(1_x, 1_y)$ the location of the bounding box center, where $1_x=(x_1+x_2)/2$ and $1_y=(y_1+y_2)/2$. Denote by $a=\log((y_2-y_1)/(x_2-x_1))$, the log aspect ratio of the bounding box and by $r=\log((y_2-y_1)+(x_2-x_1))$ the log of half the length of the perimeter of the bounding box. Refer to c, a, and r as geometric features.

Let Y denote a set of fashion item classes and $y_z$ in $\{+1, -1\}$, where z is in Y, denote a binary variable indicating whether or not B contains an object belonging to z. Let $t=(t_1, \ldots, t_K)$ in $R^{2 \times K}$ (denote pose information, which is a set of K 2D joint locations on the image. The pose information serves as additional contextual information for the detection.

An example posterior of $y_z$, given $f$, t, c, a, and r is defined as follows: $p(y_z|f, c, a, r\ t) \propto p(y_z|f)p(c|y_z, t)p(a|y_z)p(r|y_z, t)$. That is, the probability of $y_z$, given $f$, c, a, r, and t, is proportional to the product of the four probabilities on the right hand side (RHS) of the relation. This posterior assumes that p(t) and p($f$) are constant. The first term on the RHS defines the appearance-based posterior and the following terms are the priors on the geometric features. For each object proposal, we compute $p(y_z=1|f, c, a, r, t)$ and use it as a detection score. When the detection score exceeds a predetermined threshold, the object proposal is considered to be a match for the item. The predetermined threshold may be set on an item-by-item basis.

If multiple items are found to be matches for the object proposal, relative scoring may be used to determine which item is the best match, and the remaining matches may be discarded. Relative scoring takes into account the degree to which the detection score for an item exceeds the predetermined threshold for the item. For example, if an object proposal has a score of 0.6 for hat and 0.7 for belt, but the threshold for hat is 0.5 and the threshold for belt is 0.65, then the relative score for hat is greater than the relative score for belt, even though the absolute score for belt is greater than the absolute score for hat. Accordingly, the confidence that the object proposal is a hat is greater than the confidence that the object proposal is a belt, and the determination that the object proposal is a belt can be dropped.

Similarly, if multiple bounding boxes are determined to have the same item, duplicates can be filtered out by keeping only the bounding box having the highest relative score for the item. In this way, the final result will have no more than one item per bounding box and one bounding box per item.

An appearance-based posterior $p(y_z=1|f)$ can be defined as $p(y_z=1|f)=Sig(w_z^T f; \lambda_z)$, where $w_z$ is an SVM weight vector for the class z and $\lambda_z$ is a parameter of the sigmoid function $Sig(x; \lambda_z)=1/(1+\exp(-\lambda_z x))$, where exp( ) is the natural exponential function. The parameter $\lambda_z$, controls the shape of the sigmoid function. Accordingly, it may be desirable to set $\lambda_z$ based on the final detection performance on the validation set.

The term $p(r|y_z-1, t)$ is the prior on perimeter conditioned on the existence of an object from class z and pose t. Intuitively, the length of perimeter r, which captures the object size, is useful for most of the items as there is a typical size for each item. Also, r is generally proportional to the size of a person. The size of the person can be defined using t in various ways. In some example embodiments, images in a dataset may be pre-normalized such that the size of the person is roughly same, and it may be assumed that $p(r|y_z=1, t)=p(r|y_z=1)$.

The term $p(a|y_z=1)$ is the prior on the aspect ratio of the object bounding box conditioned on the existence of an object from class z. Intuitively, the aspect ratio a is useful for detecting items which have a distinct aspect ratio. For instance, the width of waist belt and glasses are most likely larger than their height. In some example embodiments, both $p(a|y_z=1)$ and $p(r|y_z=1)$ are modeled by using a one-dimensional (1D) Gaussian fitted by standard maximum likelihood estimation.

In some example embodiments, a pose dependent prior on the bounding box center is defined as $$p(c|y_z=1,t)=\Pi_{k \in T_z} p(1_x,1_y|y_z=1,t_k)=\Pi_{k \in T_z} p((1_x,1_y)-t_k|y_z=1),$$

where $T_z$ is a set of joints that are informative about the bounding box center location of the object belonging to the class z. An example algorithm to determine $T_z$ for each fashion item class z is described below. Each $p((1_x, 1_y)-t_k|y_z=1)$ models the relative location of the bounding box center with respect to the k-th joint location.

Intuitively, the locations of fashion items and those of body joints have strong correlations. For instance, the location of a hat item should be close to the location of the head joint and thus, the distribution of their offset vector, $p((1_x, 1_y)-t_{Head}|y_{Hat}=1)$ should have a strong peak around $t_{Head}$ and be relatively easy to model. On the other hand, the location of the left hand joint is less informative about the location of a hat item and thus, $p((1_x, 1_y)-t_{Lefthand}|y_{Hat}=1)$ typically will have a scattered and complex distribution which is difficult to model appropriately. Thus, using, for each fashion item, only a subset of body joints that have strong correlations with the location of that item may reduce computational complexity without sacrificing the quality of results.

The relative location of the objects with respect to the joints can be most faithfully modeled as a multimodal distribution. For instance, bags, purses and wallets are typically carried on either left or right hand side of the body, thus generating multimodal distributions. Some items have a unimodal distribution—for example, a left shoe item is most likely found near the left ankle joint. Thus, the number of modes may be determined depending on the joint-item pair.

In some example embodiments, an algorithm is used to automatically identify the subset of body joints T, associated with each item. For each pair of a fashion item z and a body joint k, $p((1_x, 1_y)-t_k|y_z=1)$ may be modeled by a Gaussian mixture model (GMM) and the parameters may be estimated by the expectation-maximization (EM) algorithm. The number of components of the GMM may be determined based on the Bayesian information criteria to balance the complexity of the model and fit to the data. To obtain $T_z$ for item z, the top one or two joints whose associated GMM have the highest likelihood are chosen. In some example embodiments, other numbers of joints are chosen. This way, for each item, body joints which have less scattered offsets are automatically chosen.

When analyzing an image, once a particular item z is detected, the patch may be fed into a fine-grained item detector for further resolution. For example, the process of FIG. 5 may determine that a belt is present, but not identify the particular brand or style of the belt. A fine-grained detector trained to notice the subtle differences between belts may be fed the image patch containing the belt to identify, if possible, the specific belt depicted in the image.

A training set for the SVMs can be created beginning with an existing set of images with ground-truth bounding boxes. The bounding boxes are enlarged (e.g., by a scale factor of 1.8) to include some surrounding pixels. For each bounding box in each image, the image is cropped to only include the region within the bounding box and the cropped image is resized to a standard size (e.g., 227 by 227 pixels).

The number of training images can be increased by running the Selective Search algorithm on the training images to generate additional bounding boxes. The additional bounding boxes lack ground-truth labels, but labels can be assigned by computing the intersection over union (IoU) for each additional bounding box with the ground-truth bounding boxes and determining that the ground-truth label for the labeled box applies to the additional box when the IoU is larger than 0.5. When the IoU is smaller than 0.1 for all classes, the generated bounding box can be used as a training instance for a background class. Additional background class instances can be selected from labeled boxes that identify items not selected for identification by the SVMs.

Using the training patches, the set of SVMs can be trained. For each SVM, the training images corresponding to the class of the SVM are used as positive samples and all other training images are used as negative samples. The parameters of the SVMs can be determined on the validation set.

Figure 6:
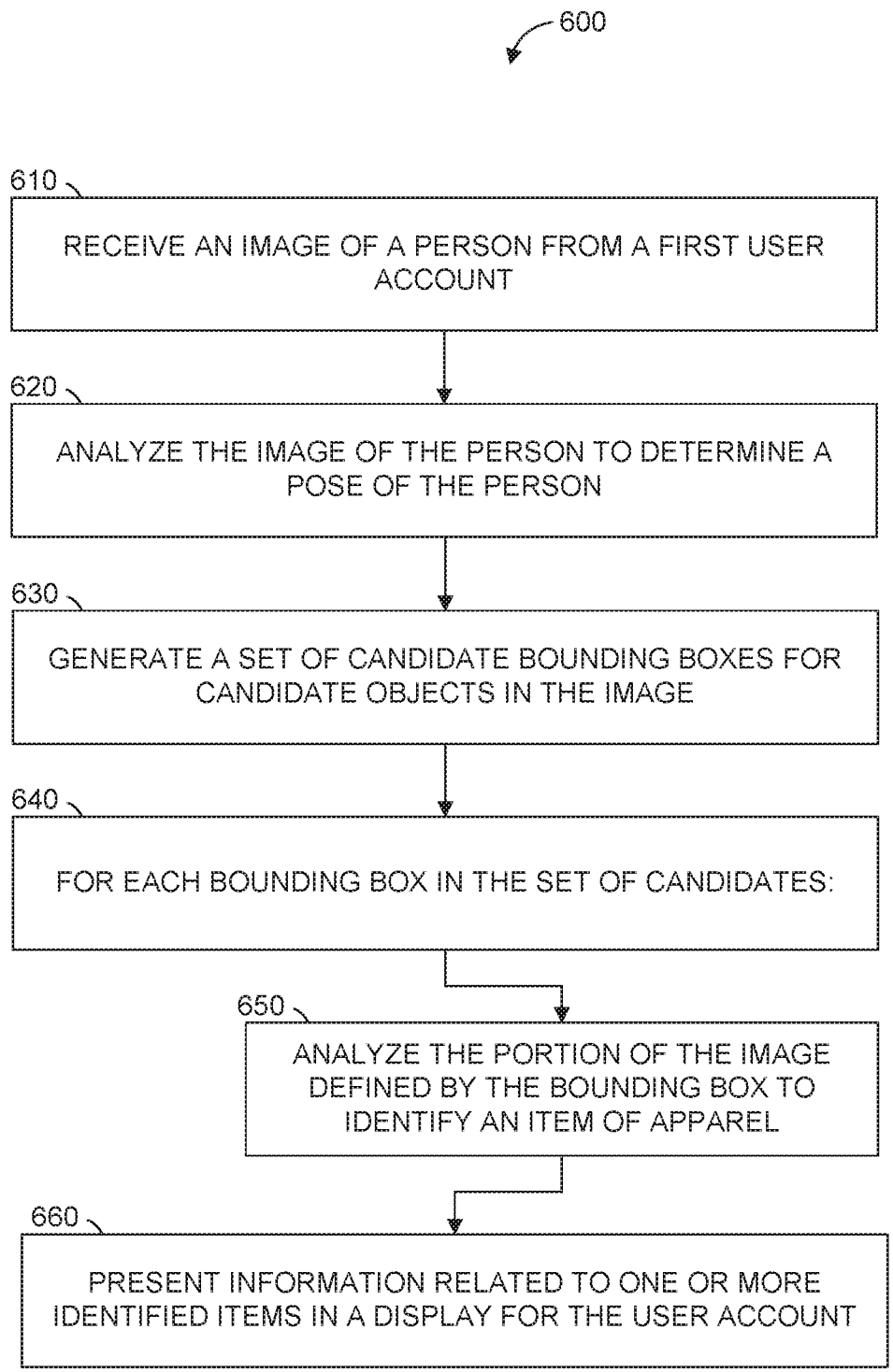
FIG. 6 is a flowchart illustrating operations of a server in performing a process of joint-based item recognition using CNNs in conjunction with pose detectors, according to some example embodiments.

FIG. 6 is a flowchart illustrating operations of the joint-based item recognition server 130 in performing a process 600 of identifying one or more items of apparel, according to some example embodiments. The process 600 includes operations 610, 620, 630, 640, 650, and 660. By way of example only and not limitation, the operations 610-660 are described as being performed by the modules 210-270.

In operation 610, the communication module 210 receives an image of a person from a first user account. For example, a user (e.g., the user 160) of a social media service may upload an image (e.g., from the device 150A) to be posted on their wall or outgoing feed. As another example, a user of an e-commerce site may upload an image to be used in part of an item listing for sale. As another example, a user of an e-commerce site may upload an image depicting an item of interest to the user. As yet another example, a user of a general-purpose search engine may upload an image as a complete or partial search query. The user account may be anonymous (e.g., identified by Internet protocol (IP) address only) or associated with a set of data for the user.

The pose identification module 220 analyzes, in operation 620, the received image to identify a pose of the person depicted in the image. Existing methods of pose identification may be used in operation 620.

In operation 630, the object proposal module 230 analyzes the received image to generate a set of candidate bounding boxes for candidate objects in the image. An R-CNN may be used by the object proposal module 230 to generate the set of candidate bounding boxes. The R-CNN starts by generating a set of object proposals in the form of bounding boxes. Then image patches are extracted from the generated bounding boxes and resized to a fixed size. Prior to the process 600, the CNN portion of the AL-CNN pretrained on a large image database for the image classification task. In operation 630, the pretrained CNN is used to extract features from each image patch, SVM classifiers (within the R-CNN) are then applied to each image patch to determine if the patch belongs to a particular class. The R-CNN CNN is suitable for the task as it can detect objects with various aspect ratios and scales without running a scanning-window search, reducing the computational complexity as well as false positives.

Each of these bounding boxes (operation 640) is then processed to determine if the portion of the image contained in the bounding box contains a recognized item of apparel, and, if so, which item of apparel is present (operation 650). For example, a set of trained SVMs can be used, one for each recognizable item. As discussed above with respect to FIG. 5, the relative position of the bounding box generated in operation 630 to joint locations generated in operation 620 may be used to modify the match probability reported by each SVM.

In operation 660, information related to one or more of the items identified in operation 650 is presented by the user interface module 250 in a display for the user account. For example, a search engine may cause the display of a set of results that includes results for a text search, the text for the search being the name of an identified item. As another example, an e-commerce site may cause the display of a set of item listings (e.g., listings of items for sale) that match the name, description, or brand of an identified item. In some example embodiments, the information is transmitted from the joint-based item recognition server 130 or the e-commerce server 120 or 140 over the network 170 to a user device (e.g., user device 150A) for presentation to the user.

Figure 7:
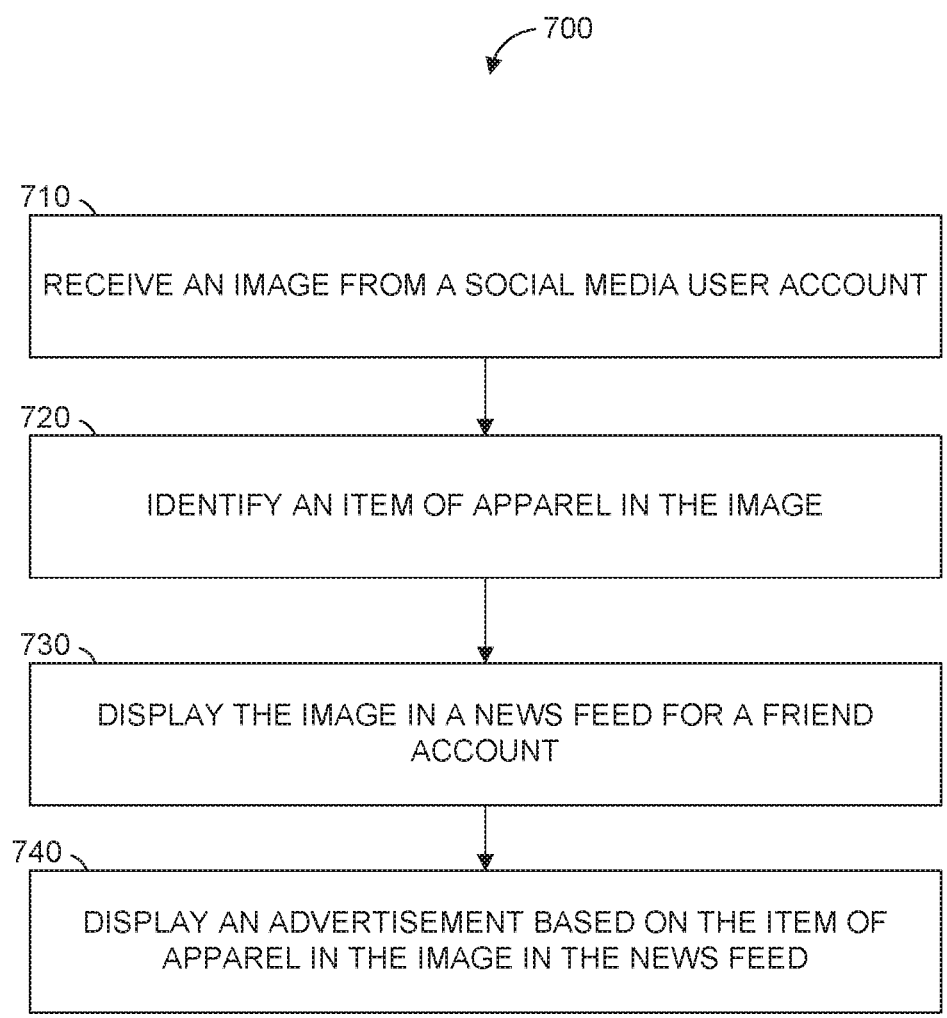
FIG. 7 is a flowchart illustrating operations of a server in performing a process of selecting and displaying advertisements, according to some example embodiments.

FIG. 7 is a flowchart illustrating operations of the joint-based item recognition server 130 in performing a process 700 of providing advertisements in a feed, according to some example embodiments. The process 700 includes operations 710, 720, 730, and 740. By way of example only and not limitation, the operations 710-740 are described as being performed by the modules 210-270.

In operation 710, the communication module 210 receives an image from a social media user account. For example, a user may upload an image of themselves, a friend, or a celebrity. In operation 720, the apparel identification module 240 identifies an item of apparel in the image. For example, the process 600 may be used to identify one or more items of apparel in the image. When multiple items are identified, one of the identified items may be selected based on popularity (e.g., count of user-entered searches for the item), affinity for the posting user e.g., count of previous references to the item by the user), affinity for text accompanying the image (e.g., when the user has entered a comment or description for the image and mentioned the item in the comment or description), affinity for a user viewing the image e.g., when the image is displayed in a news feed of a second user, an affinity between the item and the second user), or any suitable combination thereof.

The image, in operation 730, is displayed in a news feed for another user account of the social media service along with an advertisement (in operation 740). The displayed advertisement is selected based on the item identified in operation 720. For example, the advertisement may be for the identified item, for a substitute for the identified item, or for an item that is complementary to the identified item. In some example embodiments, the image is displayed with annotations. For example, red dots may be superimposed over each identified item. The advertisement may be displayed in response to a user selecting an annotation (e.g., clicking on a red dot).

Figure 8:
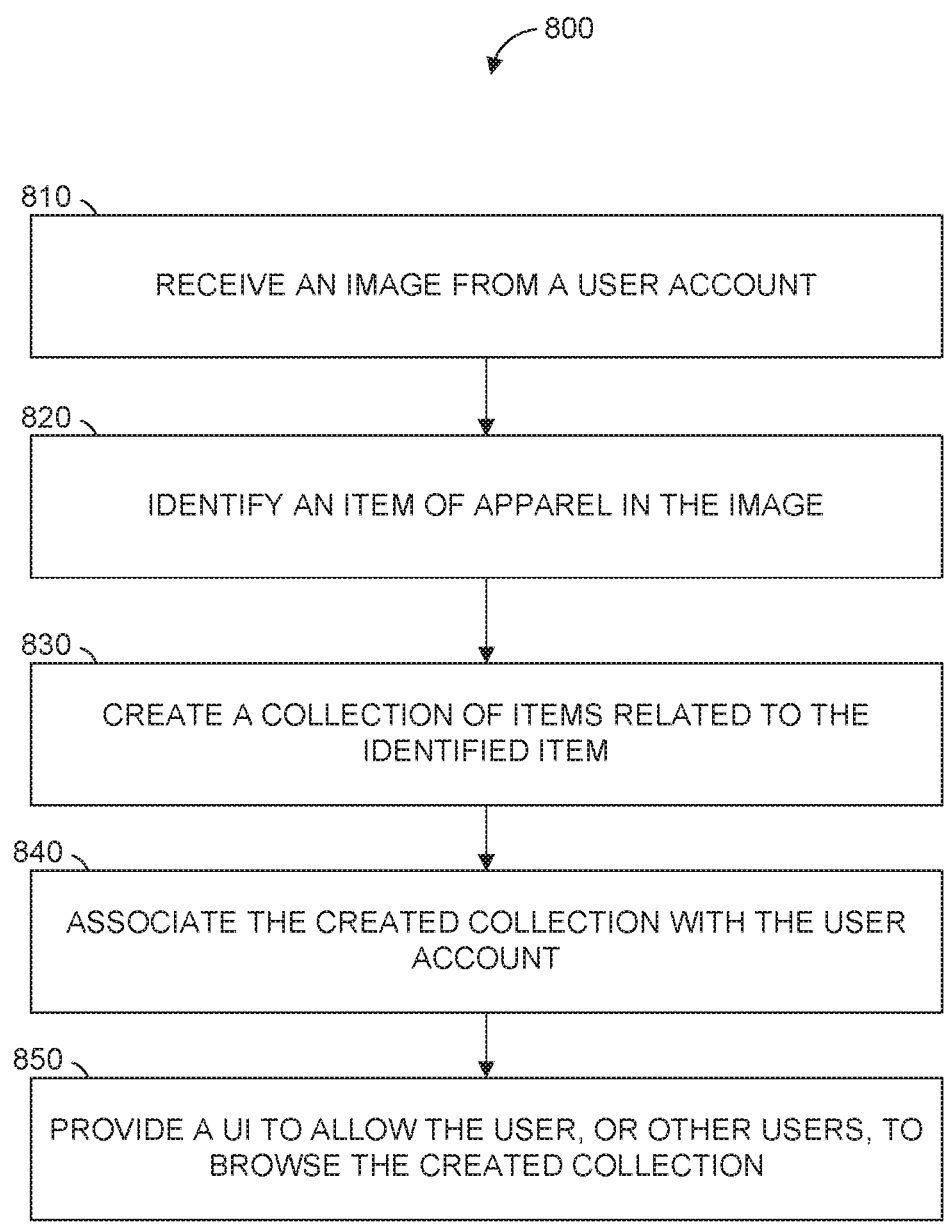
FIG. 8 is a flowchart illustrating operations of a server in performing a process of generating and displaying item collections, according to some example embodiments.

FIG. 8 is a flowchart illustrating operations of the joint-based item recognition server 130 in performing a process 800 of generating and presenting a collection of items, according to some example embodiments. The process 800 includes operations 810, 820, 830, 840, and 850. By way of example only and not limitation, the operations 810-850 are described as being performed by the modules 210-270.

In operation 810, the communication module 210 receives an image from a user account. For example, a user of an e-commerce site may upload an image of a person wearing one or more items of fashion apparel of interest to the user. The image may be uploaded using a UI that prompts the user to upload an image in order to create a collection of related items.

In operation 820, the apparel identification module 240 identifies one or more items of fashion apparel in the image. For example, the image may include a person wearing a hat.

The e-commerce site creates a collection of items related to the identified item (operation 830). For example, the e-commerce site may include a database of items for sale, each of which belongs to one or more categories. Popular items in the same category as the identified item may be selected for inclusion in the collection. As another example, identical items to the identified items may be selected for inclusion in the collection. For example, if a particular top and skirt are recognized in the image, those specific items may be added to the collection.

The size of the collection may be capped at a predetermined maximum (e.g., 20 items). When a cap is used, if the number of matching items exceeds the cap, only the highest-ranked items up to the cap are selected. If the number of matching items is below the cap, all items may be included in the collection. In some example embodiments, the generated collection is presented to the user for revision. For example, each item in the collection may include a UI element operable to remove the item from the proposed collection. As another example, each proposed item may be not included in the resulting collection until explicitly added by the user. The resulting collection is associated with the user account (operation 840).

After the collection is created, it may be presented to users of the e-commerce site, including the user that created the collection (operation 850). For example, if the items in the collection are items for sale, a user may be able to scroll forward and backward through a set of item listings for the items. The creating user may have additional permissions and control over the collection. For example, the creator may be enabled to add or remove items from the collection.

According to various example embodiments, one or more of the methodologies described herein may facilitate identifying one or more items of fashion apparel in an image of a person. Accordingly, one or more of the methodologies described herein may obviate a need for certain efforts or resources that otherwise would be involved in identifying one or more items of fashion apparel in an image of a person. Efforts expended by a user in ordering items of interest may also be reduced by one or more of the methodologies described herein. For example, accurately identifying an item of interest for a user from an image may reduce the amount of time or effort expended by the user in creating an item listing or finding an item to purchase. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Software Architecture

Figure 9:
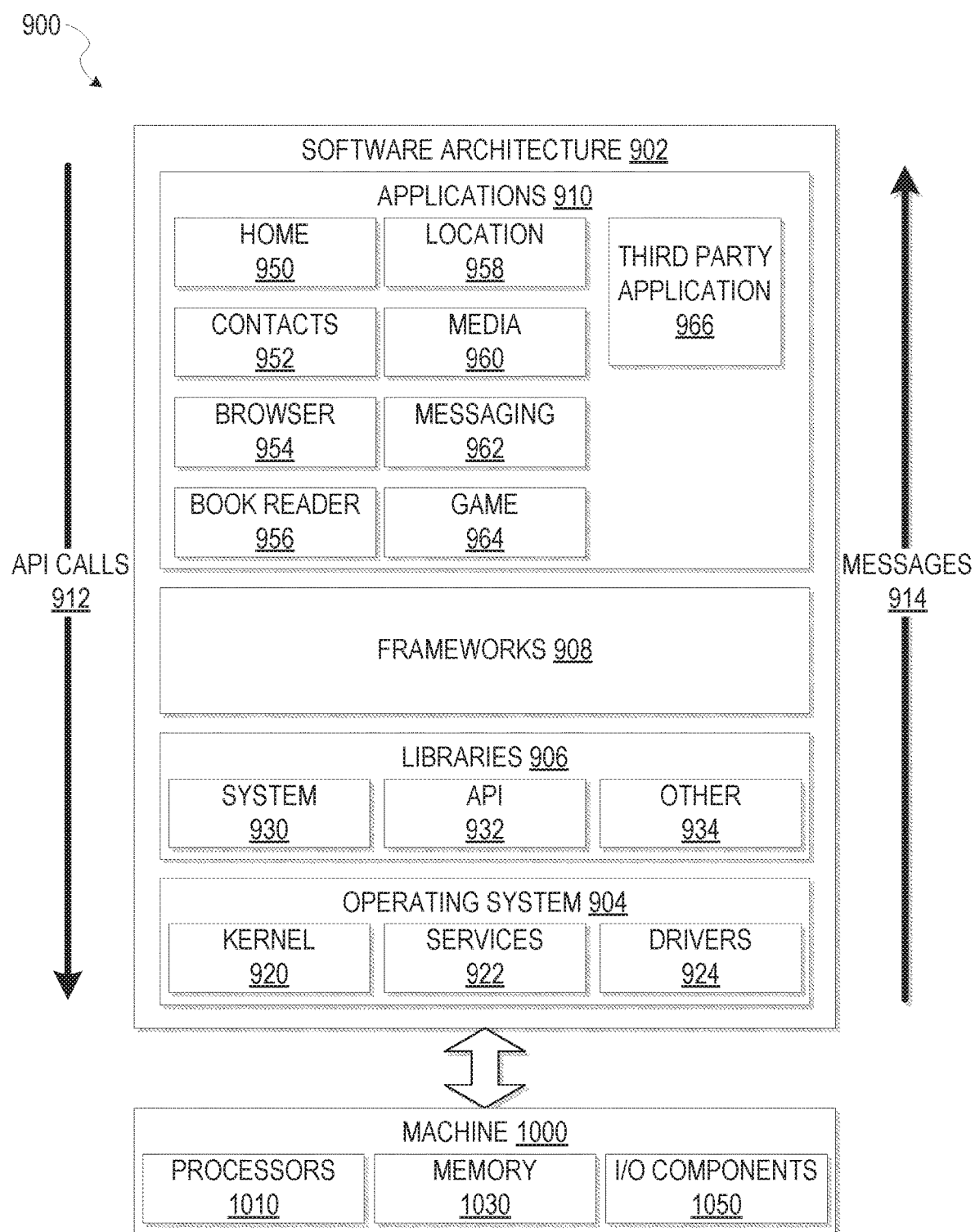
FIG. 9 is a block diagram illustrating an example of a software architecture that may be installed on a machine, according to some example embodiments.

FIG. 9 is a block diagram 900 illustrating an architecture of software 902, which may be installed on any one or more of the devices described above. FIG. 9 is merely a non-limiting example of a software architecture, and it will be appreciated that many other architectures may be implemented to facilitate the functionality described herein. The software 902 may be implemented by hardware such as machine 1000 of FIG. 10 that includes processors 1010, memory 1030, and I/O components 1050. In this example architecture, the software 902 may be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, according to some implementations.

In various implementations, the operating system 904 manages hardware resources and provides common services. The operating system 904 includes, for example, a kernel 920, services 922, and drivers 924. The kernel 920 acts as an abstraction layer between the hardware and the other software layers in some implementations. For example, the kernel 920 provides memory management, processor management (e.g., scheduling), component management, networking, security settings, among other functionality. The services 922 may provide other common services for the other software layers. The drivers 924 may be responsible for controlling or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 906 provide a low-level common infrastructure that may be utilized by the applications 910. The libraries 906 may include system libraries 930 (e.g., C standard library) that may provide functions such as memory allocation functions, string manipulation functions, mathematic functions, and the like. In addition, the libraries 906 may include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 may also include a wide variety of other libraries 934 to provide many other APIs to the applications 910.

The frameworks 908 provide a high-level common infrastructure that may be utilized by the applications 910, according to some implementations. For example, the frameworks 908 provide various graphic user interface (GUI) functions, high-level resource management, high-level location services, and so forth. The frameworks 908 may provide abroad spectrum of other APIs that may be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as third party application 966. According to some embodiments, the applications 910 are programs that execute functions defined in the programs. Various programming languages may be employed to create one or more of the applications 910, structured in a variety of manners, such as object-orientated programming languages (e.g., Objective-C, Java, or C++) or procedural programming languages (e.g., C or assembly language). In a specific example, the third party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 966 may invoke the API calls 912 provided by the mobile operating system 904 to facilitate functionality described herein.

Example Machine Architect and Machine-Readable Medium

Figure 10:
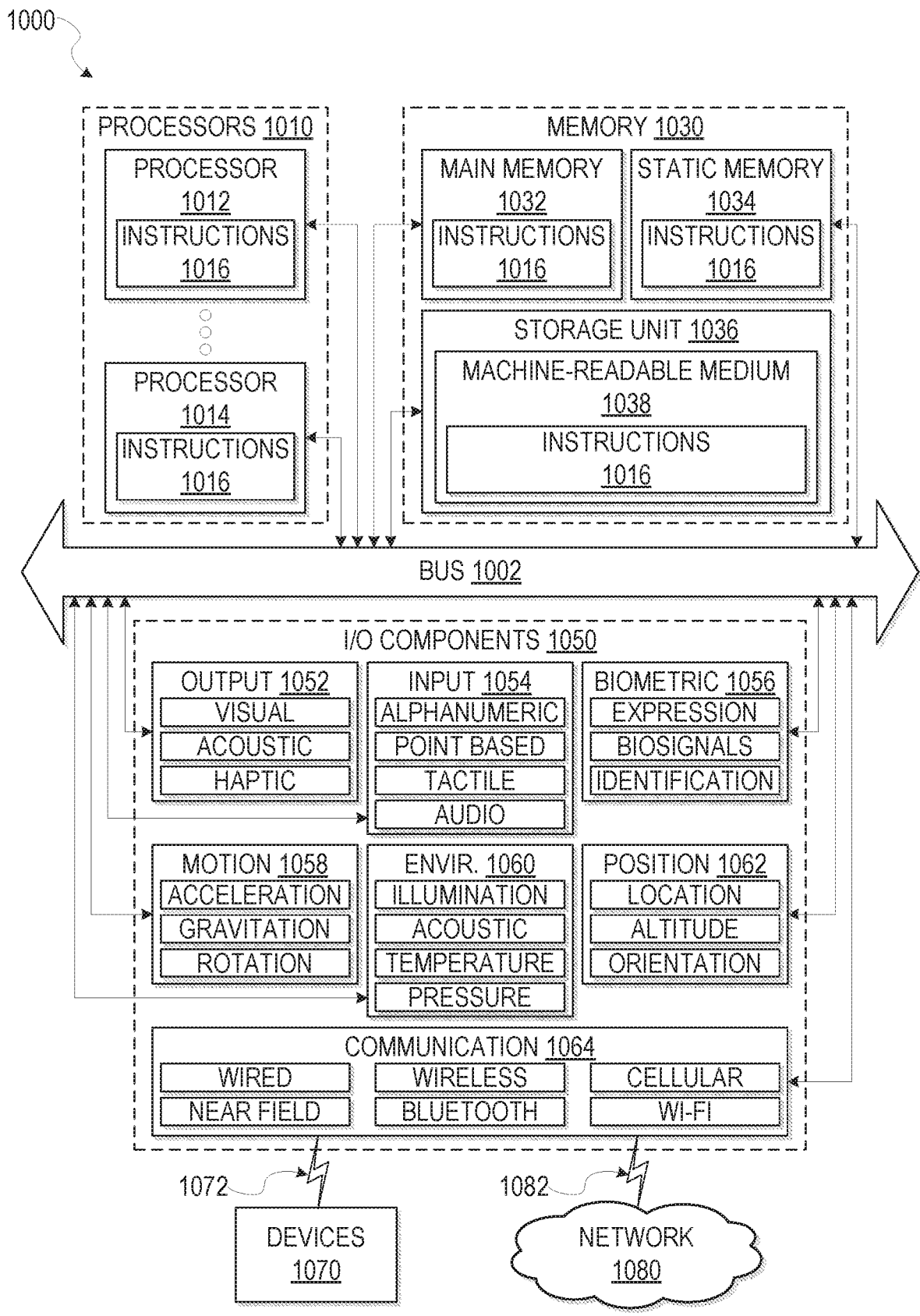
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically. FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other via a bus 1002. In an example embodiment, the processors 1010 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof nay include, for example, processor 1012 and processor 1014 that may execute instructions 1016. The term "processor" is intended to include multi-core processors that may comprise two or more independent processors (also referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory 1030 may include a main memory 1032, a static memory 1034, and a storage unit 1036 accessible to the processors 1010 via the bus 1002. The storage unit 1036 may include a machine-readable medium 1038 on which is stored the instructions 1016 embodying any one or more of the methodologies or functions described herein. The instructions 1016 may also reside, completely or at least partially, within the main memory 1032, within the static memory 1034, within at least one of the processors 1010 (e.g., within the processor's cache memory), or any suitable combination thereof during execution thereof by the machine 1000. Accordingly, in various implementations, the main memory 1032, static memory 1034, and the processors 1010 are considered as machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components e.g., a microphone), and the like.

In some further example embodiments, the I/O components 1050 include biometric components 1056, motion components 1058, environmental components 1060, or position components 1062 among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components e.g., one or more thermometer that detect ambient temperature), humidity sensor components, pressure sensor components (e.g., barometer), acoustic sensor components e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 1062 include location sensor components (e.g., a Global Position System (GPS) receiver component), altitude sensor components e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 include a network interface component or another suitable device to interface with the network 1080. In further examples, communication components 1064 include wired communication components, wireless communication components, cellular communication components, Near Field Communication (NIT) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, in some implementations, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1064, such as, location via Internet Protocol (1P) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Furthermore, the machine-readable medium 1038 is non-transitory (in other words, not having any transitory signals) in that it does not embody a propagating signal. However, labeling the machine-readable medium 1038 as "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory having instructions embodied thereon; and
one or more processors configured by the instructions to perform operations comprising:
providing, to a pose identifier, an image depicting a person;
generating an initial bounding box for a portion of the image;
providing the portion of the image of the person to a first support vector machine (SVM) classifier, and a second SVM classifier as input, the first SVM classifier corresponding to a first item of apparel and the second SVM classifier corresponding to a second item of apparel;
receiving output from the first SVM classifier that indicates a first probability that the portion of the image contains the first item of apparel;
receiving output from the second SVM classifier that indicates a second probability that the portion of the image contains the second item of apparel;
analyzing, by the pose identifier, the image of the person to determine a set of joints of the person, each joint of the set of joints representing coordinates of the image and being associated with one or more types of items of apparel; and
generating, by the pose identifier, pose data comprising the set of joints of the person;
modifying the first probability from the first SVM classifier based on the first item of apparel and a distance between a first joint of the set of joints, the first joint being associated with a first body part associated with the first item of apparel, and the initial bounding box of the portion of the image, wherein the first probability is modified by a first factor proportional to the distance between the first joint and a point in the initial bounding box;
modifying the second probability from the second SVM classifier based on the second item of apparel and a distance between a second join of the set of joints, the second joint being associated with a second body part associated with the second item of apparel, and the initial bounding box of the portion of the image, wherein the second probability is modified by a second factor proportional to the distance between the second joint and the point in the initial bounding box;
generating a result bounding box based on the modified first probability and the modified second probability, the result bounding box being associated with the first item of apparel; and
identifying the first item of apparel for the portion of the image based on the result bounding box.

2. The system of claim 1, wherein the operations further comprise:
receiving the image of the person;
selecting an advertisement based on the identified first item of apparel; and
causing display of the image of the person and the advertisement.

3. The system of claim 2, wherein:
the image of the person is owned by a first user account; and
the display of the image of the person and the advertisement is to a second user account.

4. The system of claim 2, wherein:
the causing of the display of the image of the person and the advertisement comprises:
causing the display of the person with an annotation superimposed over the identified first item of apparel; and
in response to a user interaction with the annotation, causing the display of the advertisement.

5. The system of claim 1, wherein:
the proximity between the initial bounding box and the joint is a distance between a center of the initial bounding box and the joint.

6. The system of claim 1, wherein:
the identification of the first item of apparel is further based on a ratio of height and width of the portion of the image.

7. The system of claim 1, wherein:
the identification of the first item of apparel is further based on a logarithm of a ratio of height and width of the portion of the image.

8. The system of claim 1, wherein:
the modifying of the first probability is further based on a distance between the initial bounding box and a second joint of the set of joints.

9. The system of claim 1, wherein the operations further comprise:
receiving the image of the person from a client device;
identifying a set of images based on the identified first item of apparel; and
causing the set of images to be displayed on the client device.

10. The system of claim 9, wherein:
the identifying of the set of images based on the identified first item of apparel identifies images containing the identified first item of apparel.

11. The system of claim 9, wherein:
the identifying of the set of images based on the identified first item of apparel identifies images of items for sale in an online marketplace.

12. The system of claim 1, wherein:
the modifying of the first probability based on the first item of apparel and the proximity between the joint and the initial bounding box of the portion of the image increases the first probability; and
the modifying of the second probability based on the second item of apparel and the proximity between the joint and the initial bounding box of the portion of the image decreases the second probability.

13. A method comprising:
providing, to a pose identifier, an image depicting a person;
generating an initial bounding box for a portion of the image;

providing the portion of the image of the person to a first support vector machine (SVM) classifier, and a second SVM classifier as input, the first SVM classifier corresponding to a first item of apparel and the second SVM classifier corresponding to a second item of apparel;

receiving output from the first SVM classifier that indicates a first probability that the portion of the image contains the first item of apparel;

receiving output from the second SVM classifier that indicates a second probability that the portion of the image contains the second item of apparel;

analyzing, by the pose identifier, the image of the person to determine a set of joints of the person, each joint of the set of joints representing coordinates of the image and being associated with one or more types of items of apparel; and generating, by the pose identifier, pose data comprising the set of joints of the person;

modifying the first probability from the first SVM classifier based on the first item of apparel and a distance between a first joint of the set of joints, the first joint being associated with a first body part associated with the first item of apparel, and the initial bounding box of the portion of the image, wherein the first probability is modified by a first factor proportional to the distance between the first joint and a point in the initial bounding box;

modifying the second probability from the second SVM classifier based on the second item of apparel and a distance between a second join of the set of joints, the second joint being associated with a second body part associated with the second item of apparel, and the initial bounding box of the portion of the image, wherein the second probability is modified by a second factor proportional to the distance between the second joint and the point in the initial bounding box;

generating a result bounding box based on the modified first probability and the modified second probability, the result bounding box being associated with the first item of apparel; and identifying the first item of apparel for the portion of the image based on the result bounding box.

14. The method of claim 13, further comprising:
receiving the image of the person;
selecting an advertisement based on the identified first item of apparel; and causing display of the image of the person and the advertisement.

15. The method of claim 14, wherein:
the image of the person is owned by a first user account; and
the display of the image of the person and the advertisement is to a second user account.

16. The method of claim 13, wherein:
the proximity between the initial bounding box and the joint is a distance between a center of the initial bounding box and the joint.

17. The method of claim 13, wherein:
the identification of the first item of apparel is further based on a ratio of height and width of the portion of the image.

18. The method of claim 13, wherein:
the modifying of the first probability based on the first item of apparel and the proximity between the joint and the initial bounding box of the portion of the image increases the first probability; and the modifying of the second probability based on the second item of apparel and the proximity between the joint and the initial bounding box of the portion of the image decreases the second probability.

19. A machine-readable medium having instructions embodied thereon, the instructions executable by a processor of a machine to perform operations comprising:

providing, to a pose identifier, an image depicting a person;

generating an initial bounding box for a portion of the image;

providing the portion of the image of the person to a first support vector machine (SVM) classifier, and a second SVM classifier as input, the first SVM classifier corresponding to a first item of apparel and the second SVM classifier corresponding to a second item of apparel;

receiving output from the first SVM classifier that indicates a first probability that the portion of the image contains the first item of apparel;

receiving output from the second SVM classifier that indicates a second probability that the portion of the image contains the second item of apparel;

analyzing, by the pose identifier, the image of the person to determine a set of joints of the person, each joint of the set of joints representing coordinates of the image and being associated with one or more types of items of apparel; and generating, by the pose identifier, pose data comprising the set of joints of the person;

modifying the first probability from the first SVM classifier based on the first item of apparel and a distance between a first joint of the set of joints, the first joint being associated with a first body part associated with the first item of apparel, and the initial bounding box of the portion of the image, wherein the first probability is modified by a first factor proportional to the distance between the first joint and a point in the initial bounding box;

modifying the second probability from the second SVM classifier based on the second item of apparel and a distance between a second join of the set of joints, the second joint being associated with a second body part associated with the second item of apparel, and the initial bounding box of the portion of the image, wherein the second probability is modified by a second factor proportional to the distance between the second joint and the point in the initial bounding box;

generating a result bounding box based on the modified first probability and the modified second probability, the result bounding box being associated with the first item of apparel; and identifying the first item of apparel for the portion of the image based on the result bounding box.

20. The machine-readable medium of claim 19, wherein:
the modifying of the first probability based on the first item of apparel and the proximity between the joint and the initial bounding box of the portion of the image increases the first probability; and the modifying of the second probability based on the second item of apparel and the proximity between the joint and the initial bounding box of the portion of the image decreases the second probability.

* * * * *